(12) United States Patent
Trevino et al.

(10) Patent No.: US 7,616,107 B2
(45) Date of Patent: Nov. 10, 2009

(54) COMBINATION HORN AND GEAR SELECTION INDICATOR SYSTEM

(75) Inventors: Christopher Charles Trevino, Temecula, CA (US); Gerhard Heinrich Fiedler, Buena Park, CA (US)

(73) Assignee: American Supercars LLC, Fall Brook, CA (US)

( * ) Notice: Subject to any disclaimer, the term of this patent is extended or adjusted under 35 U.S.C. 154(b) by 349 days.

(21) Appl. No.: 11/818,190

(22) Filed: Jun. 13, 2007

(65) Prior Publication Data

US 2008/0309473 A1    Dec. 18, 2008

(51) Int. Cl.
| | |
|---|---|
| B60K 23/00 | (2006.01) |
| B60K 26/00 | (2006.01) |
| B62D 1/00 | (2006.01) |
| B62D 1/16 | (2006.01) |
| B60Q 1/00 | (2006.01) |
| G08B 23/00 | (2006.01) |
| F16H 63/42 | (2006.01) |

(52) U.S. Cl. .................. 340/456; 340/693.9; 116/28.1; 180/78

(58) Field of Classification Search ................ 74/473.3, 74/473.31, 473.32, 321, 322, 335, 336; 340/456, 340/438, 693.5, 693.9; 116/28.1; 180/336, 180/78; 200/61.54–61.57
See application file for complete search history.

(56) References Cited

U.S. PATENT DOCUMENTS

| | | | | |
|---|---|---|---|---|
| 4,797,538 | A | * | 1/1989 | Schick .......................... 235/10 |
| 5,261,291 | A | * | 11/1993 | Schoch et al. ............. 74/484 R |
| 5,425,686 | A | * | 6/1995 | Grange ......................... 477/79 |
| 5,552,761 | A | | 9/1996 | Kazyaka ...................... 340/456 |
| 7,278,510 | B1 | * | 10/2007 | Richards ..................... 180/336 |
| 2002/0152827 | A1 | * | 10/2002 | Hayashi et al. ............ 74/473.3 |
| 2004/0050673 | A1 | * | 3/2004 | Takahashi et al. ........ 200/61.54 |
| 2006/0005660 | A1 | * | 1/2006 | Rick et al. .................... 74/523 |

* cited by examiner

*Primary Examiner*—Jennifer Mehmood
(74) *Attorney, Agent, or Firm*—Louis L. Dachs

(57) ABSTRACT

The invention is a combination horn button and gear position indicator system for an automobile, the automobile having wire having a first end terminating at the steering wheel and a second end terminating at least partially down the steering column. In detail, the invention includes a housing movably mounted to the steering wheel, said housing movable from a first position to a second position, with a spring biasing the housing to the first position. horn actuation switch mounted in the housing, which is actuated to a closed position when the housing is moved from the first position to the second position. A gear position indicator is mounted on the housing. Processor circuits for sending the horn actuation switch signal to the horn relay and sending a gear position signal from the transmission to the gear position indicator via the one wire.

5 Claims, 3 Drawing Sheets

COMBINATION HORN AND GEAR SELECTION INDICATOR SYSTEM

BACKGROUND OF THE INVENTION

1. Field of the Invention

The invention relates to the field of automobiles and, in particular, to an integration of a gear shift position indicator on the steering wheel of the automobile.

2. Description of Related Art

Originally, all transmission shifting was accomplished manually with a stick type shifter positioned on the floor. However, this made three abreast seating in the front seat of the automobile difficult. To provide for three abreast seating in the front seat, column-mounted manual shifting systems became popular. With automatic transmissions, the gear selector was mounted on the steering column, behind the steering wheel and a mechanical gear selection display was mounted on the steering column or on the dash board. Movement of the gear selector caused an indicator to move across a dial with gear positions indicated thereon.

This mounting position remained popular even when automatic transmissions were introduced. However, sport cars and most racing cars still used floor-mounted shifters. Chrysler Corporation in the 1950's time frame introduced a push button controlled transmission located in the center of the steering wheel hub. However, it proved to have a short life and the column mounted shift lever remained the standard.

When the sport or sporty car became popular, the trend reverted back to mounting the shifter on the floor, in reality on top of the transmission. In fact, with the advent of "bucket seats" limiting the front of the passenger compartment to two, center mounting the shifter was a significant cost saver. In these automobiles, an electronic display was mounted on the dash board.

Gear position indicators have been developed for manual shifting transmissions. For example, U.S. Pat. No. 5,552,761 Gear Section Indicator For Manual Transmissions by T. V Kazyaka discloses a system where in switches mounted about the gear shift lever sense gear position and a gear position indicator is mounted on the end of the knob on the end of the lever. The drawback to this system is that the driver must look down ward and to the right to see the indicator.

What is needed, is an indicator system can be retrofitted to older cars that can be more easily observed and is easy to install. Furthermore, it should not require significant mechanical changes to the automobile, lest the total cost of the system and its installation become prohibitive. Ideally, the indicator system should mount on the steering wheel, without requiring rewiring of the automobile.

Thus, it is a primary object of the invention to provide a gear selection indicator that is mounted on the steering wheel hub.

It is another primary object of the invention to provide a gear selection indicator that is mounted on the steering wheel hub, but retains the horn button feature.

It is a further object of the invention to provide a gear selection indicator that is mounted on the steering wheel hub, but retains the horn button feature and does not require rewiring of the steering column.

SUMMARY OF THE INVENTION

The invention is a transmission gear position indicator system for an automobile, the automobile having a steering column assembly including a steering wheel at one end and steering column, and an electrical wire having a first end terminating at the steering wheel and a second end terminating at least partially down the steering column, and a transmission having a gear position sensor device providing a gear selection output signal, and a horn relay for actuating a horn. In detail, the system includes a housing movably mounted to the steering wheel, the housing movable from a first position to a second position. A spring biases the housing to the first position.

A normally open horn actuation switch mounted in the housing, which is actuated to a closed position when the housing is moved from the first position to the second position. A transmission gear position indicator mounted in the housing.

A first processor circuit mounted on the steering wheel is coupled to the switch, the indicator and the first end of the one wire. A second processor is coupled to the second end of the one wire, the horn relay and the transmission indicator device. Thus the second processor receives the output signal of the gear position sensor device, encodes this signal and sends it through the one wire to the first processor, which decodes it and sends it to the gear position indicator; and upon movement of the housing to the second position the first processor receives this horn switch signal, encodes it, sends it to the second processor, which actuates the horn relay.

Additionally, if the automobile includes paddle or button shifting actuators on the steering column as set forth in co-pending U.S. patent application Ser. No. 10/829,773 Shifting System For An Automobile Automatic Transmission by A. K. Richards (common assignee) or U.S. patent application Ser. No. 11/454,503 Shifting System For A Vehicle by C. C. Trevino, et al. (common assignee), both herein incorporated by reference, the first and second processor circuits can accommodate them. The up shift and down shift actuators are coupled to two of the switch input terminals of the first processor circuit and two of the output terminals of the second processor are coupled to the up shift and down shift controllers as described in the above referenced patent applications.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
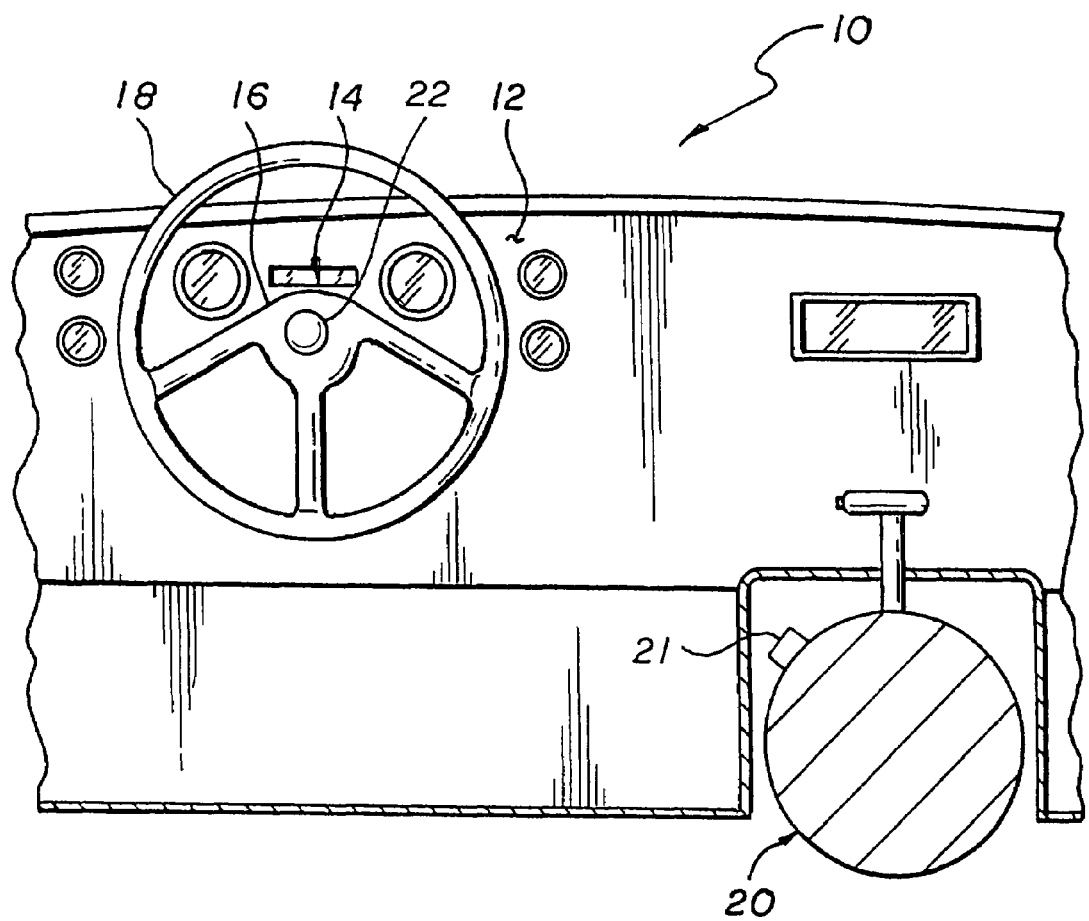
FIG. 1 is a view looking forward in the passenger compartment of a prior art automobile.
Figure 2:
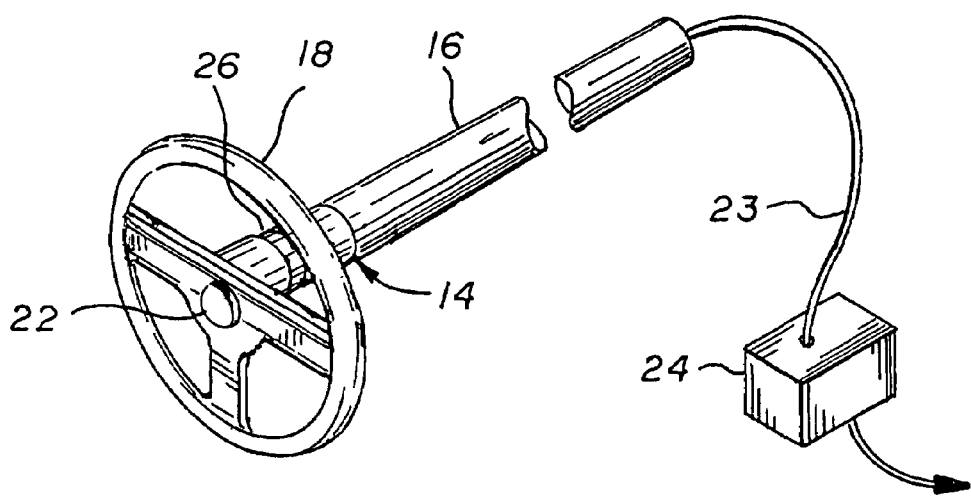
FIG. 2 is a perspective view of the steering column assembly shown in FIG. 1.

Referring to FIG. 1, which is a partial view of the dashboard of a prior art automobile, the dashboard 10 includes an instrument panel 12. Also illustrated are the steering column assembly 14 including a steering column 16 and steering wheel 18, and transmission 20, with gear position signal generator 21. The Steering wheel 18 includes a horn button 22. Referring to FIG. 2, the one wire 23 is used to connect the horn button 22 to a horn relay 24, which connects to a horn (not shown). A slip ring assembly 26 is mounted to the steering wheel 18 so that electrical contact can be maintained along the wire 23, thus eliminating wire twisting when the steering wheel is rotated.

Figure 3:
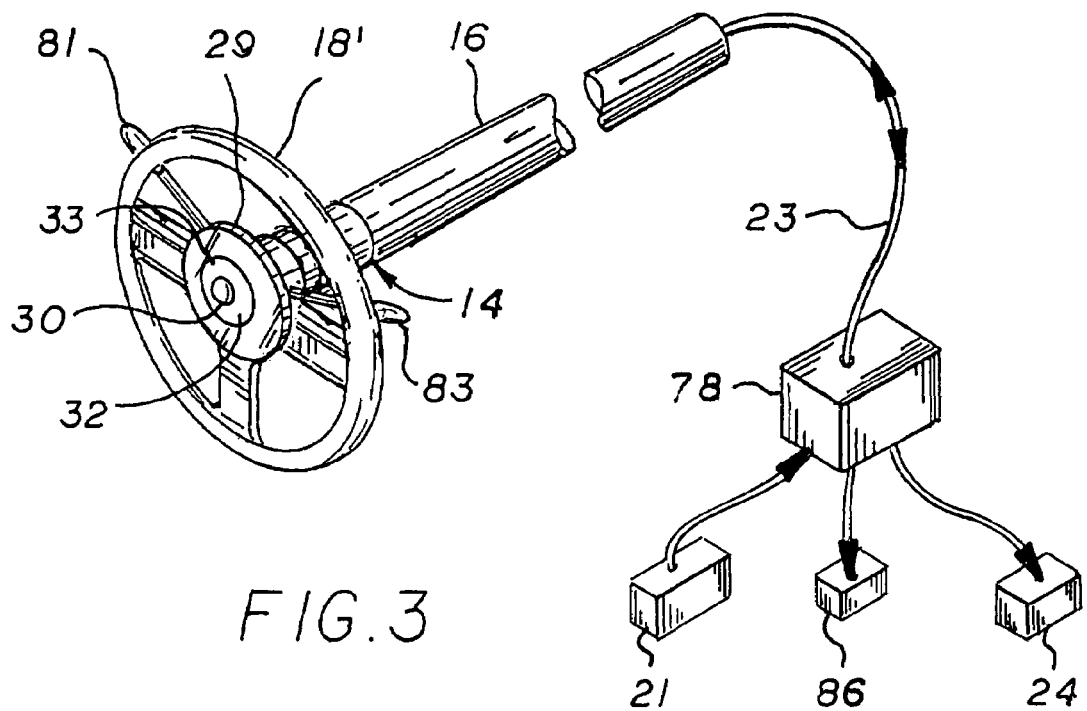
FIG. 3 is a view similar to FIG. 2 illustrating the incorporation of a transmission indicator system into the steering column.
Figure 4:
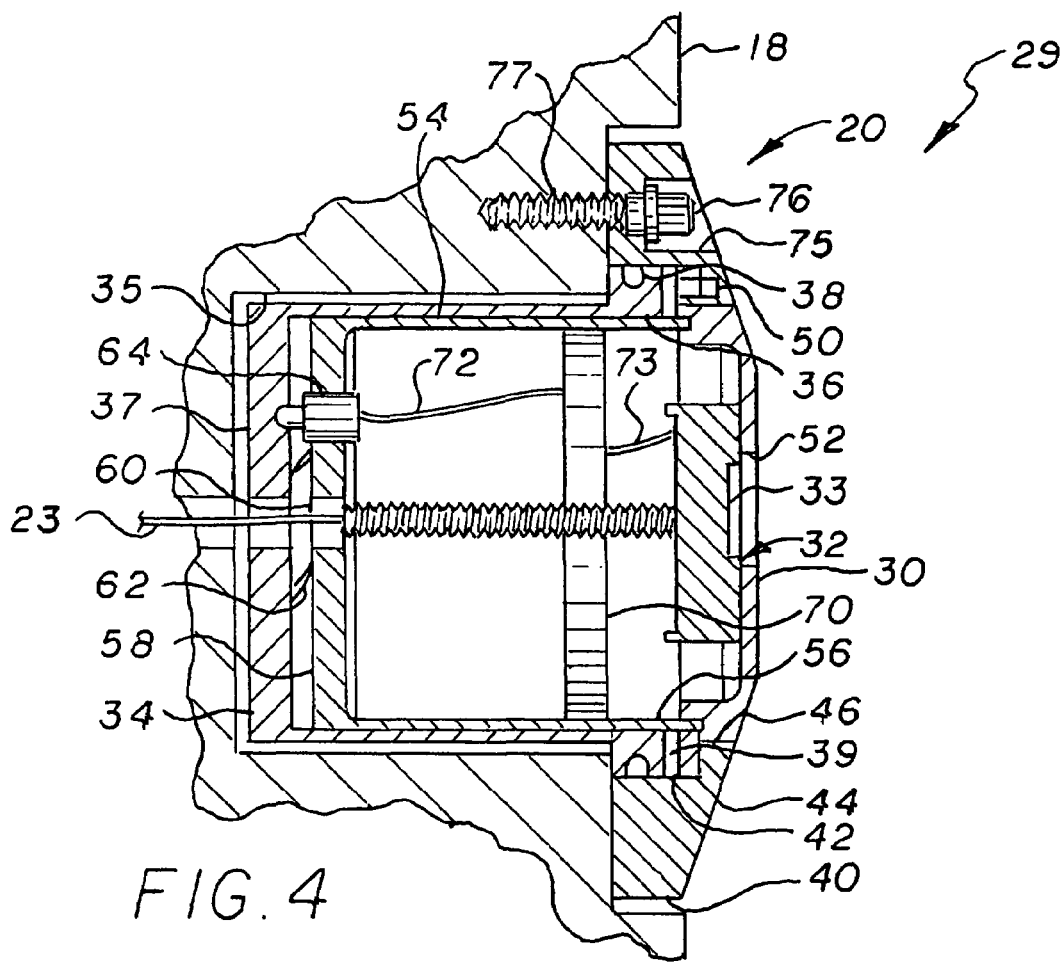
FIG. 4 is a cross-sectional view of a portion of the steering wheel illustrated in FIG. 3 showing the horn button and transmission indicator system.

Referring to FIGS. 3 and 4, the horn button is replaced with an assembly 29 which is a combination horn button 30 containing an electronic transmission gear position indicator 32 having a display panel 33. Preferably, the display panel 33 is manufactured by Avago Technologies, San Jose, Calif., Part Number HDSP-5501. However, there are numerous other display panels that can be used. Assembly 29 is mounted to a steering wheel 18' adapted to mount on the existing steering column 16. In detail, the assembly 29 includes a hollow housing 34 that is mounted in recess 35 in the steering wheel 18 and includes having a first open 36 and a closed off second end 37. The first end 36 includes an outward directed circular flange 38. A cover member 40 includes a recess 42 terminating in an inward directed wall 44 having a central opening 46. The recess 42 is adapted to mate with the circular flange 38, leaving a gap 39 between the flange 38 and wall 44. A circular horn button 46 includes an outer flange 50 that extends into the gap 39 and is thus movably mounted therein. The horn button 46 further includes an opening 52. The display 32 is mounted to the horn button 46 such that the display panel 33 is visible in the opening 52.

An inner housing 54 is slidably mounted in the housing 34 having first an open end 56 secured to the horn button 30 and a closed off second end 58 having an opening 60 therein. A disc spring 62 is mounted in between the end 58 and end 37 of the housing 34, thus biasing the horn button 30 against the wall 44 in the cover member 40. Mounted in the end 58 of the housing 54 is a push button normally open switch 64. Thus when the driver pushes on the horn button 30 the switch 64 is closed. The closing of the switch 64 will cause a signal to be sent to the horn relay 24, in a manner to be subsequently discussed. The switch 64 and display 32 are electrically connected to control circuit or processor 70 also mounted within the inner housing 54 by wires 72 and 73 respectively, the control circuit 70 is electrically connected to the one wire 23. Fastener holes 75 extend through the flange cover member 40 for receiving threaded bolts 76, which engage thread holes 77 in the steering wheel 18' and secure it thereto.

Figure 5:
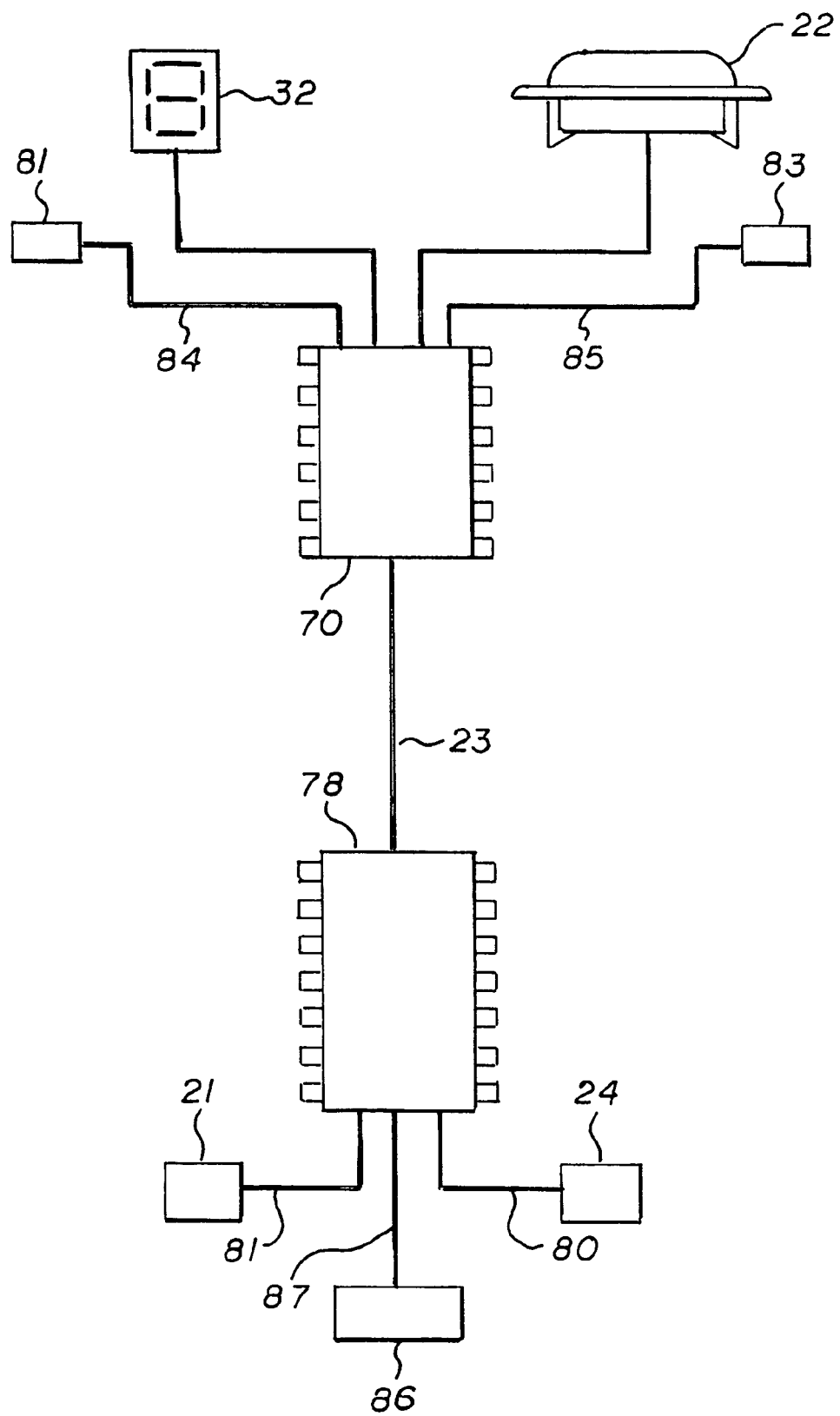
FIG. 5 is a schematic of the system for providing horn signaling and transmission gear position indication.

Referring to FIG. 5, the control circuit 70 is an off the shelf processor Model Part Number PIC16LF88-I/SO manufactured by Microchip Technology, Incorporated, Chandler, Ariz. There are other commercially available processors that can be used. The control circuit 70 is connected to the one wire 23 which in turn connects to a second control circuit or processor 78, which preferably is manufactured by Microchip Technologies, Incorporated, part number PIC18F6722-I/PT. Of course, there are other suitable models. The control circuit 78 provides an output signal to the horn relay 24 via line 80 and receives input signals, either digital or analog, from gear position sensor device 21 via line 81. Thus second processor 78 receives the output signal of the gear position sensor device, encodes this signal and sends it through the one wire to said first processor 70, which decodes it and sends it to said gear position indicator 32; and upon movement of the housing 34 to the second position the first processor 70 receives the horn switch 64 signal, encodes it, and sends it to said second processor 78, which actuates the horn relay 24.

Additionally, if the automobile includes paddle or button shifting actuators on the steering column as set forth in co-pending U.S. patent application Ser. No. 10/829,773 Shifting System For An Automobile Automatic Transmission by A. K. Richards (common assignee) or U.S. patent application Ser. No. 11/454,503 Shifting System For A Vehicle by C. C. Trevino, et al. (common assignee), both herein incorporated by reference, the control circuits 70 and 78 can accommodate them. An up shift actuator 81 and down shift actuator 83 are coupled to the control circuit 70 by wires 84 and 85 respectively, and two of the output terminals of the control circuit 78 are coupled to the up shift and down shift controller 86 via line 87 as described in the above referenced patent applications.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to automobile industry and, in particular, to the after market automobile parts industry.

The invention claimed is:

1. A combination horn button and gear position indicator system for an automobile, the automobile having a steering column assembly including a steering wheel at one end and steering column, and an electrical wire having a first end terminating at the steering wheel and a second end terminating at least partially down the steering column, and a transmission having a gear position sensor device providing a gear selection output signal and a horn relay for actuating a horn, the system comprising:

a housing movably mounted to the steering wheel, said housing movable from a first position to a second position;

means to bias said housing to said first position;

a normally open horn actuation switch mounted in said housing, which is actuated to a closed position when said housing is moved from said first position to said second position; and a gear position indicator mounted on said housing; and a first processor circuit mounted on the steering wheel coupled to said switch, said indicator and the first end of the wire; and a second processor coupled to second end of the wire, the horn relay and the transmission gear position sensor device;

such that said second processor receives the output signal of the gear position sensor device, encodes this signal and sends it through the wire to said first processor, which decodes it and sends it to said gear position indicator; and upon movement of said housing to said second position said first processor receives a horn switch signal, encodes it, and sends it to said second processor, which actuates the horn relay.

2. The system as set forth in claim 1 comprising:

up shift and down shift actuators mounted on said steering wheel; said actuators coupled to said first processor circuit; and an up shift and down shift control circuit coupled to said second processor.

3. A combination horn button and gear position indicator system for an automobile, the automobile having a steering column assembly including a steering wheel at one end and steering column, and an electrical wire having a first end terminating at the steering wheel and a second end terminating at least partially down the steering column, and a transmission having a gear position sensor device providing a gear selection output signal and a horn relay for actuating a horn, the system comprising:

- a housing movably mounted to the steering wheel, said housing movable from a first position to a second position;
- means to bias said housing to said first position;
- a normally open horn actuation switch mounted in said housing, which is actuated to a closed position when said housing is moved from said first position to said second position; and
- a gear position indicator mounted on said housing; and
- circuit means for receiving the gear selection output signal from the transmission gear position sensor device and transmitting an actuation signal to said gear position indicator; and upon movement of said housing to said second position, causing said switch to close, actuating the horn relay.

4. The system as set forth in claim 1 wherein said circuit means comprises:

- a first processor circuit mounted on the steering wheel coupled to said switch, said indicator and the first end of the wire; and
- a second processor coupled to second end of the wire, the horn relay and the transmission gear position sensor device;
- such that said second processor receives the output signal of the gear position sensor device, encodes this signal and sends it through the wire to said first processor, which decodes it and sends it to said gear position indicator; and upon movement of said housing to said second position, said first processor receives horn switch signal, encodes it, sends it to said second processor, which actuates the horn relay.

5. The system as set forth in claim 1 comprising:

up shift and down shift actuators mounted on said steering wheel; said actuators coupled to said first processor circuit; and an up shift and down shift control circuit coupled to said second processor.

* * * * *